United States Patent [19]

Muskulus

[11] 4,265,012

[45] May 5, 1981

[54] DEVICE FOR COLLECTING WINDINGS IN STATORS OR THE LIKE

[75] Inventor: Willi Muskulus, Frankfurt am Main, Fed. Rep. of Germany

[73] Assignee: Balzer & Droll KG, Niederdorfelden, Fed. Rep. of Germany

[21] Appl. No.: 14,620

[22] Filed: Feb. 23, 1979

[51] Int. Cl.³ .......................................... H02K 15/06
[52] U.S. Cl. ...................................... 29/736; 29/596; 140/92.1
[58] Field of Search ................ 29/596, 598, 732, 736, 29/564.1; 140/92.1, 1

[56] References Cited

U.S. PATENT DOCUMENTS

| | | | |
|---|---|---|---|
| 3,151,638 | 10/1964 | Hill | 140/92.1 |
| 3,815,207 | 6/1974 | Hubegger | 29/596 X |
| 3,829,953 | 8/1974 | Lauer et al. | 29/734 |
| 3,879,842 | 4/1975 | McKinley et al. | 29/596 |
| 4,151,636 | 5/1979 | Lauer et al. | 29/596 |

Primary Examiner—Carl E. Hall
Attorney, Agent, or Firm—Larson, Taylor and Hinds

[57] ABSTRACT

Apparatus for collecting windings in a stator or the like includes a collecting tool having collecting lamellae disposed in a ring, an aligning star piece, and means for moving the aligning star piece from a retracted position to an alignment position between the lamellae. The apparatus also includes means for moving a stator sheet packet having an aperture therethrough into position with the aperture adjacent the free ends of the lamellae. In accordance with the invention, the apparatus includes means for moving the aligning star piece from its retracted position through the aperture in the sheet packet and then into its alignment position to align the stator sheet packet and the ring of lamellae. The apparatus has many advantages over conventional devices in which the aligning star piece is first aligned with the ring of lamellae and in which the stator sheet packet is subsequently applied and aligned.

12 Claims, 5 Drawing Figures

4,265,012

DEVICE FOR COLLECTING WINDINGS IN STATORS OR THE LIKE

FIELD OF THE INVENTION

The invention relates to a device for axial collecting of prefabricated windings in stators of electrical machines by means of a collecting tool comprising lamellae disposed in a ring and an aligning star piece that can be introduced axially by a guide device between the lamellae before the setting of the stator sheet packet onto the lamellae.

Such a device is described for instance in German OS No. 22 08 865. The machine shown there is not suitable for automation however, because of its structure and the sequence of movements of the tool parts, since independently of the type of control device, there would be excessively long paths lengths and operating times for the various tool movements, and despite the great precision of the device, the reject quota would be relatively high.

Susceptibility to disturbance in automated winding and collecting devices is to be attributed primarily to the fact that the winding wire is a light, flexible element which is readily damaged, and that moreover, in thrusting a plurality of windings through a narrow slit of the collecting tool, it tends to become jammed. What is involved then is very secure, very precise guiding of the wire by the tool parts that engage it, in every phase, whereby the adaptability of the tools to different stator sheet packets and/or windings is to be regarded as an impediment in practice since, especially in the transition from one work step to the next, and especially after a changed setting of individual tool parts, difficulties arise. A truly automatic operation therefore requires not only a suitable control but also a machine structure whose configuration and sequence of functions will be as simple as possible on the one hand, in view of the outlay for control and manufacture, and on the other hand, in spite of the necessary precision, will be insensitive to broad tolerances of the stator sheet packet, and contingencies of movements of the latter and of the windings in conveying and work processes.

The invention, therefore, deals with the problem of improving a collecting device of the described type, in the sense of the above remarks, so that with the least possible outlay for construction, there will be acceptably functioning automatic operation.

BRIEF SUMMARY OF THE INVENTION

The problem is solved according to the invention in that the aligning star piece can be introduced between the lamellae through the hole of the stator sheet packet, held above or in front of the free ends of the lamellae by means of a holding device.

The invention thus deviates from the usual arrangement according to which first the aligning star piece and then the stator sheet packet is conveyed to the collecting tool. This known functional sequence has the consequence that a device which holds and guides the aligning star piece has to be released from the star piece and moved away after the setting in of the star piece in the collecting tool, in order to make room for the device that holds and guides the stator sheet packet. After the stator sheet packet has been set on the lamellae of the collecting tool, according to the earlier system, the guiding and holding device for the alignment star piece must be returned to alignment with the main axis of the collecting tool, again to receive the aligning star piece during the collecting operation.

DETAILED DESCRIPTION OF PREFERRED EMBODIMENTS

The complicated collecting movements are greatly simplified and speeded up in accordance with the present invention in which the stator sheet packet is first conveyed to the collecting tool but not yet set on, and then the aligning star piece is introduced between the lamellae of the collecting tool, through the stator sheet packet which is held above or in front of the collecting tool. This succession of movements makes it possible for the aligning star piece to remain connected with its guiding and retaining device throughout the whole delivery, collecting and discharge operation.

Because of the elimination of otherwise necessary movements, there is a substantial increase in production. A further reduction of structural outlay and a speed-up of production is attained in a preferred embodiment of the invention, in an arrangement whereby the free ends of the lamellae of the collecting tool extend in the course of each collecting process from an initial retracted position in which they penetrate only a short distance into the hole of the stator which is set on in this position, at least all the way through the stator hole and can be returned to the initial (retracted) position. In this way, the movements of the stator sheet packet in the direction of the long axis of the tool that are otherwise necessary are substantially shortened. Moreover, the danger that the stator sheet packet will tilt in being set onto the lamellae is lessened. This tipping has practically no significance when the packet is set on the collecting tool manually because the operator manipulates the packet with the sensations of his fingertips. However, in automatic delivery of the stator sheet packet, tipping would lead to abrasion of the lamellae and might cause interruption of the work.

The drive for movement of the lamellae, in a further advantageous embodiment of the invention, can also be provided in such a way that, depending upon the case in question, the lamellae can selectively be moved with their free ends only just through the stator hole or beyond it until the star piece of conventional collecting tools is introduced through the stator hole. In this way, without further complication, a tool is obtained that is versatile and adaptable.

The invention is particularly suitable for automatic winding and collecting tools in which a plurality of collecting tool upper parts, comprising collecting and cover strip lamellae as well as a central collecting star piece, move by means of a turntable or other conveyor between a plurality of stations which include a winding station and a collecting station, whereby the drive means for the lamellae and the collecting star piece are mounted at the stations in question, and are temporarily connected with the parts of the collecting tool upper part for the work process in question (see, for example, German AS No. 20 01 677). In such an embodiment, there is the possibility that the collecting star piece and a ring that supports the collecting lamellae may be moved by separate push rods. Alternatively, however, it may be provided that a threaded annulus that is fixed against rotation and supports the lamellae may be moved by rotation of an axially stationary threaded sleeve that is engaged therewith. In that event, the sleeve can be driven for example, by a gear connected with it, or it can be arranged on a push rod of the collecting star piece in such a way that it will be fixed against rotation but axially slidable on the push rod, said rod being a rotatable spline shaft and having a rotary drive. In the latter case, there needs to be only one single push rod coupled with the upper part of the collecting tool at the collecting station.

It is customary to thrust the insulating cover strips that close the stator grooves into said grooves after collection of the windings, in one stroke with the collecting operation (see U.S. Pat. No. 3,324,563). Accordingly, the kind and method of delivery of the cover strips affects the outlay for construction and the functioning sequence of a collecting device. Here there is the difficulty that, for reasons of rationalizing of manufacture, the cover strips are only cut and shaped from a strip of starting material just before their use. Because of the relatively long duration of the individual production of all the cover strips needed for a stator sheet packet, a magazine is usually provided in a known way in the lower part of the tool, the height of said magazine corresponding to the length of the cover strips. This magazine delivers the cover strips next to or below the cutting and shaping mechanism. The batch of cover strips contained in the magazine is then thrust in through guides on the cover strip lamellae of the tool upper part in the course of the collecting operation.

It is known that the cover strips can be prepared at a distance from the collecting tool and stored and then thrust from the free ends of the cover strip lamellae into their guides before the collecting operation. From there, they are transferred into the stator grooves in the course of the collecting operation (see U.S. Pat. No. 3,742,596).

In another preferred embodiment of the invention, it is proposed that the cover strips be individually insertable directly into the upper part of the collecting tool, and that they be stored there until the collecting process. This has the advantage that there is elimination of a special cover strip magazine, whereby there is a saving of space, path length and time, and possibly also a simplification, in that the guides of the cover strips in the cover strip lamellae are wider than those in the known cover strip magazines. Accordingly, possibly in a single instance where formerly in transfer to another stator sheet cut, the mechanism for shaping and storing the cover strips had to be replaced, now no more changes need be undertaken on the under part of the tool because of a changed stator sheet cut.

The insertion of the individual cover strips after their shaping, directly into the upper part of the collecting tool, in contrast to the known arrangement according to U.S. Pat. No. 3,742,596, can be effected after the windings have already been placed in the collecting tool. There is no complication involved here because the collecting tool upper part has to be rotatable about its long axis and indexable in any event.

Complete automation of the collecting device has foundered in the past because there was no known economical mechanical take-off of the stator sheet packet from a stack and reliably guided delivery to the collecting tool. The difficulties that had to be overcome stemmed primarily from the fact that stator sheet packets prepared for the collecting process are already provided with a groove insulation, whereby the strips that form the groove insulation extend beyond the stator sheet packet on either side at the front. It was not possible, therefore, to stack the relatively heavy stator sheet packets one above the other with a vertical main axis, but rather, it was necessary to store them or lay them individually with a horizontal main axis. Delivery of stator sheet packets to the collecting tool from such a position was mechanically so cumbersome that stator packets have usually been set on by hand.

To make possible a complete automation of the collecting process with simple means, it is provided in a preferred practical embodiment of the invention that the stator sheet packets with inserted groove insulation, which are to be wound, are deliverable to the collecting tools from a magazine comprising rollers, automatically, by means of a conveyor device whereby laterally staggered rollers of a roller train have a separation that is somewhat greater than the diameter of the stator hole plus grooves, so that the stator sheet packets are braced at the sides by the rollers with vertical main axis against the groove insulation strips that extend over the front and hence the strips are relieved of the weight of the stator sheet packet. Advantageously, the magazine is a transportable receptacle with a plurality of roller trains next to each other and one above the other, whereby advantageously for delivery of the stator sheet packets from the receptacle onto the conveyor device, the receptacle can be set in a slanted position, or a frame which supports the roller train in the receptacle can be set in a slanted position. If stator sheet packets of different cross section are stored in the receptacle, it is advisable also to have the possibility of adjusted setting of the distance between the laterally staggered rollers that support the stator sheet packet. Charging of the receptacle advantageously also is done automatically, directly at the work station where the stator sheet packet receives the groove insulation. The stator sheet packet can be placed in the receptacle from either side with horizontal roller trains, by means of a pusher, or it can simply be set onto the slanted roller train.

The invention is described below with reference to the drawing.

Figure 1:
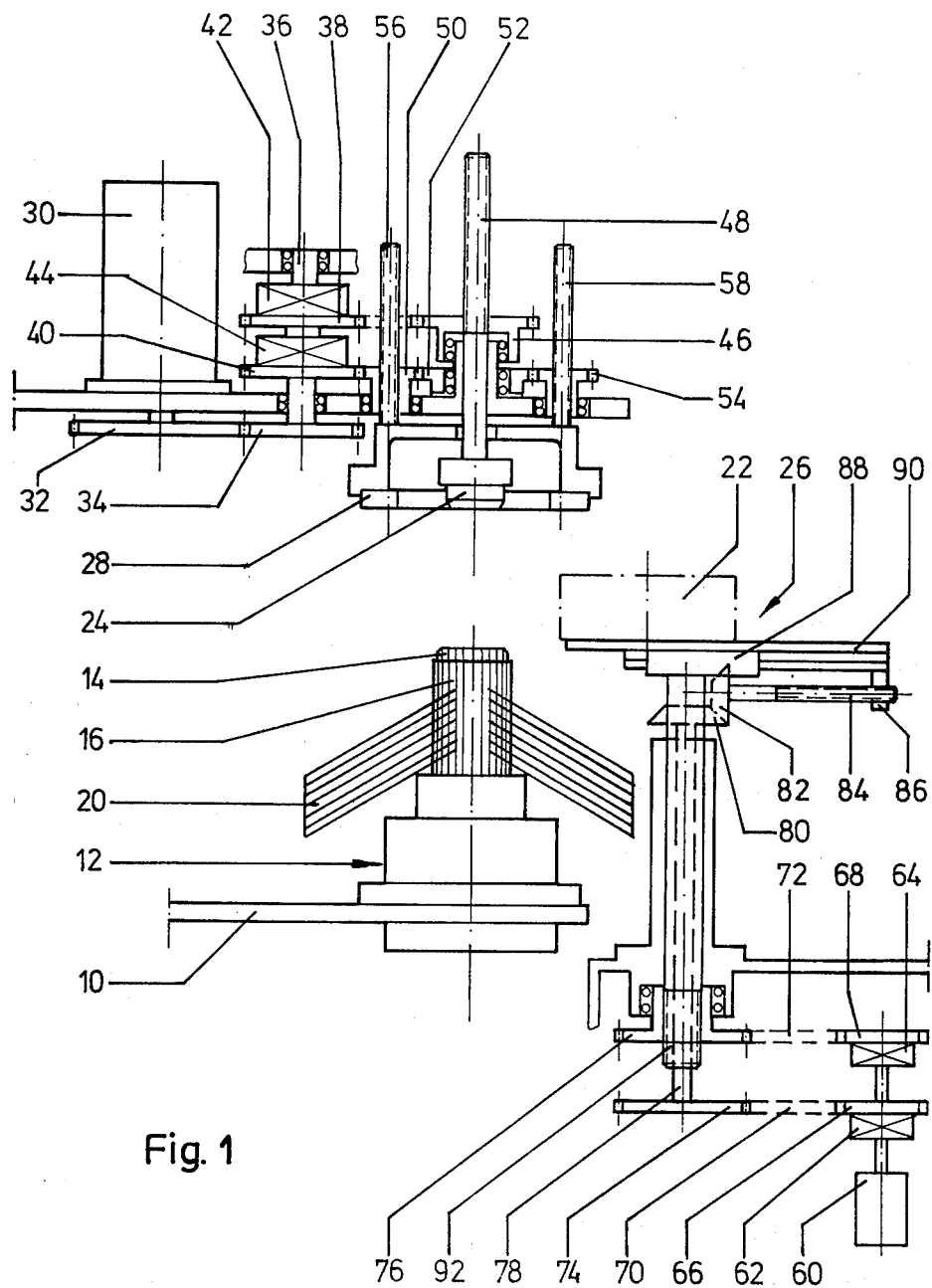
FIG. 1 shows a simplified cross section through a collecting device according to the invention.

FIG. 1 shows only schematically a part of an automatic winding and collecting device and the collecting station that pertains to it. The winding section is described in detail in my co-pending application Ser. No. 14,546 filed by me herewith and entitled "Device For Winding Stators Or The Like." In their basic structure, such automatic winding and collecting apparatus operating with a turntable 10 and a plurality of stations are known, e.g. from German AS No. 20 01 677 and German OS No. 1,938,184.

Figure 2:
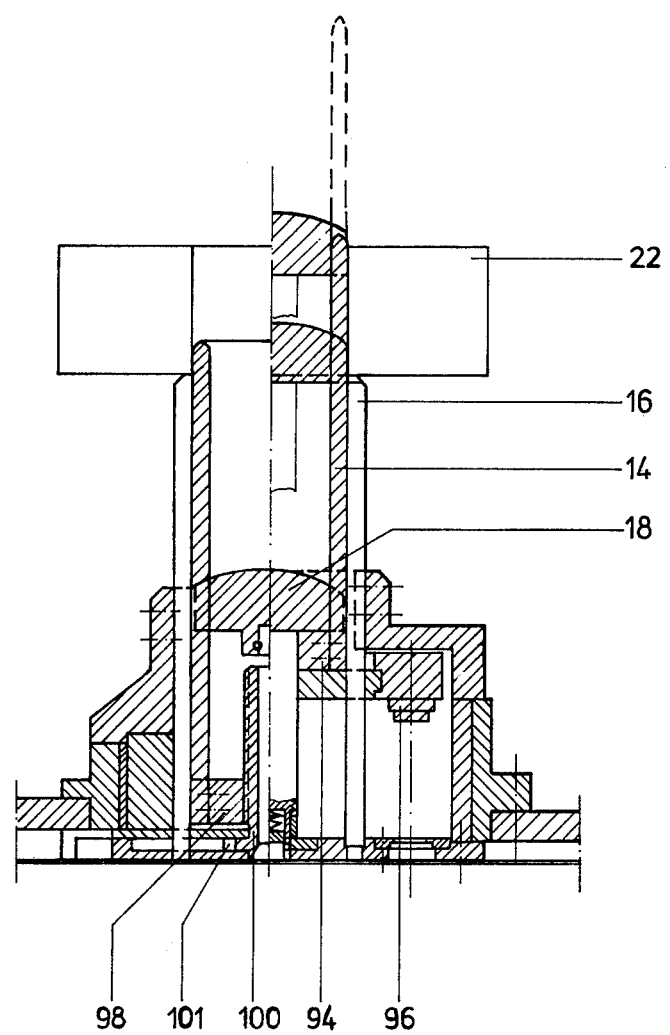
FIG. 2 is a cross section through two different forms of embodiment of the collecting tool of the device of FIG. 1.

Several collecting tools 12 are mounted on turntable 10, consisting of collecting lamellae 14 disposed in a ring, and radially external thereto, cover strip lamellae 16 disposed in a ring, and a central collecting star piece 18 (see FIG. 2). The basic structure of such a collecting tool is described, for example, in German OS No. 26 12

904 and the above-mentioned German AS No. 20 01 677.

At a winding station of turntable 10, windings 20 are hung in the slits between the collecting lamellae 14, and then turntable 10 is moved along so that the collecting tools 12 bearing windings 20 reach the collecting station shown in FIG. 1. There, before the actual collecting operation, a stator sheet packet 22 must be set on lamellae 14, for which operation an aligning star piece 24 is utilized in a known way, this piece having the task of centering lamellae 14 and stator sheet packet 22 with respect to each other.

As shown in FIG. 1 and on the left half of FIG. 2, collecting lamellae 14 are pulled down in the starting position so far that their free ends only extend a few millimeters, e.g. 5 to 12 mm beyond the free ends of cover strip lamellae 16. In this position of lamellae 14 and 16, windings 20 are placed in collecting tool 12, and in this position of the lamellae, collecting tool 12 also reaches the collecting station. Advantageously at this stage the cover strips are already in the guides of the cover strip lamellae 16. As mentioned above, the cover strips are preferably thrust individually into the guides of cover strip lamellae 16 of the collecting tool, directly from the known cutting and shaping mechanism, hence they are not stored first in a cover strip magazine below turntable 10, nor are they brought into collecting tool 12 from a separate magazine as a whole from the free ends of lamellae 14 and 16. Storing of the cover strips directly in the guides of the cover strip lamellae 16 is advantageously effected in a special shift position of turntable 10, where collecting tool 12 is intermittently turned about its long axis as it is filled with cover strips. This position can be located in the turning direction of turntable 10, ahead of or behind the winding station. Advantageously a position ahead of the winding station is chosen, where the stator sheet packet is also received after the collecting of windings 20 by collecting tool 12.

To initiate the collecting operation, stator sheet packet 22 is first moved by a delivering and retaining device that is designated 26 as a whole, to a position close above the free ends of collecting lamellae 14, and held aligned with the long axis of collecting tool 12. The precise position of the stator sheet packet 22 on delivering and retaining device 26 can be ensured for example by pins which engage from below in holes adapted thereto in the stator sheet packet.

Then aligning star piece 24 is introduced through the central hole of stator sheet packet 22 into the ring of collecting lamellae 14. Thereafter the delivering and retaining device 26 is lowered so that stator sheet packet 22 is set on the free ends of the cover strip lamellae 16. A hold-down device 28, concentric to aligning star piece 24, said hold-down device being annular, for example, and axially movable, travels from above against stator sheet packet 22 and thereafter holds it securely in its position on the ends of cover strip lamellae 16 during the collecting process. After the above mentioned pins are lowered downwardly from the holes in the stator sheet packet in which they fit, the delivering and retaining device 26 is moved back to the side, to fetch the next stator sheet packet.

Even during the subsequent collecting process, aligning star piece 24, moving ahead of collecting star piece 18, is pulled back through the stator hole. At the end of the collecting operation, hold-down device 28 returns to its upper starting position, so that turntable 10 can move on and convey the stator sheet packet with the collected winding to the take-off station.

According to the example of embodiment of FIG. 1, aligning star piece 24 and hold-down device 28 have a common drive motor 30 which acts via gears 32 and 34 on a shaft 36 on which two gears 38 and 40 are borne so as to be freely rotatable. By controllable couplings 42 and 44 respectively, a connection that is fixed in rotation can be established between shaft 36 and gears 38 and 40 respectively. Gear 38 then drives a gear 46 that has an internal thread or is connected with a nut that engages a threaded spindle 48 which is held so as to be fixed in rotation and which presents aligning star piece 24. Obviously the aligning element can be fastened on threaded spindle 48 so that it can be exchanged.

The mentioned gear 40 drives a gear 50, and via an intermediate gear 52 it drives another gear 54. Synchronously driven gears 50 and 54 cooperate via internal threads or via nuts connected with them, with threaded spindles 56 and 58 respectively, which present the hold-down device 28.

The vertical and horizontal movement drive for delivering and holding device 26 consists of a motor 60 which acts via controllable couplings 62 and 64 and gears 66 and 68 that are respectively connected therewith, and via other gears or chains 70 or 72, on gears 74 and 76 respectively. The drive of gear 74 is transmitted to a horizontally disposed threaded spindle 84 via a shaft 78 and bevel gears 80, 82. Spindle 84 drives a carriage 90 which slides horizontally in a horizontal guide 88, via a nut 86 that is adapted to said spindle. Guide 88 itself is guided vertically and is connected with a vertically disposed hollow threaded spindle 92 which is axially movable via an internal thread or a nut on gear 76.

It is obvious that there are other available controllable drives for the described movements of aligning star piece 24, hold-down device 28 and stator sheet packet 22 on delivery and retaining device 26.

FIG. 2 shows alternative forms of embodiment for the drive of collecting lamellae 14. On the righthand half of the drawing, the collecting lamellae 14 are interconnected by a ring 94 on which there is fixed a coupling part 96 for a push rod (not shown) which can be connected by a ball lock coupling, for example. For details on a possible practical embodiment, reference may be made to German AS No. 20 01 677. In the same way, collecting star piece 18 has another releasable ball lock coupling for another push rod, which is not shown. Cam plates or screw drives come into question as drive organs for the push rods, driven by controllable power cylinders or electric motors.

On the lefthand half of FIG. 2, an embodiment is shown in which only one single push rod is rotatably connected with collecting star piece 18. A ring 98 which supports collecting lamellae 14 is provided with an internal thread or connected with a nut that is in screwed engagement with a threaded sleeve 100 which is held axially stationary. Said sleeve 100 can be driven in rotation since it is seated on the push rod of the collecting star piece 18 and fixed for rotation therewith, said rod in the present case being a spline shaft that is axially slidable. Threaded sleeve 100 can serve at the same time as a stop for collecting star piece 18 and is held axially by a plate 101 that is fixedly connected with it, which plate cooperates with controllable lock means and in this way sleeve 100 may be locked to prevent rotation. Since the stroke and the rotary motion of the push rod are individually controlled, any relative motions of collecting star piece 18 and the collecting lamellae 14 can be produced.

Normally the movement of the collecting lamellae 14 is so controlled that they move out from the position indicated in the lefthand part of FIG. 2 at the beginning of the collecting process, through the stator hole to the position indicated on the righthand side of FIG. 2 with dashed lines, then held, and after completion of the collecting process, they are again withdrawn together with collecting star piece 18 into the lower starting position. However, without any further complication of the tool and drive, there is also the possibility of moving the collecting lamellae 14, as indicated in FIG. 2 by dashed lines, equally and synchronously with the collecting star piece 18 during its whole stroke, whereby there will be no friction or clamping between the wire windings and the collecting lamellae 14 that travel with them. However, the formation of the winding head on the upper front side of the stator sheet packet is more complicated. The movement of the collecting lamellae 14 that is selected will be governed according to the conditions in the particular case. The described device does not need to be rebuilt in transition from one to the other collecting method, since only its controls need to be changed.

The withdrawal of the collecting lamellae 14 into the lower starting position according to the lefthand side of FIG. 2 has the advantage that even at the take-off station of turntable 10, the structural height can be kept low and take-off of the wound stator will be facilitated. Moreover, with this position of the lamellae in the winding station, clamping of the wire will be avoided.

Figure 3:
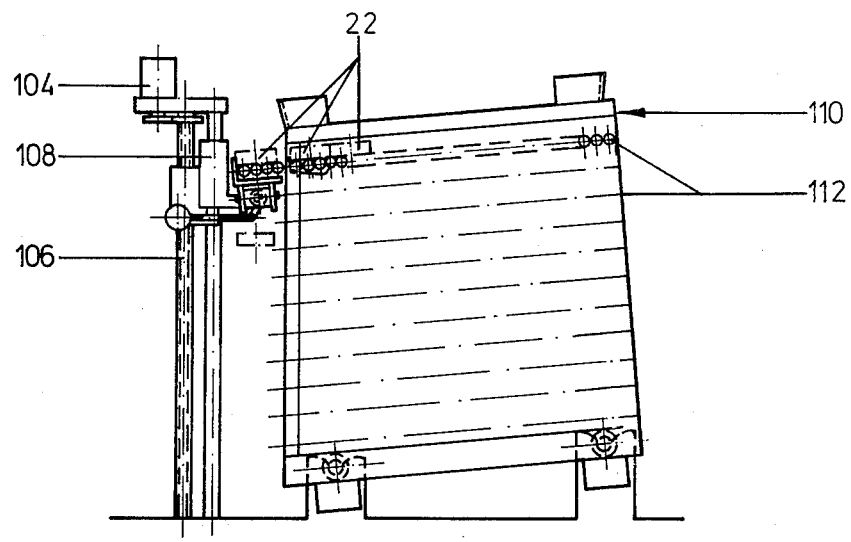
FIG. 3 is a side view of a part of a delivery device for stator sheet packets, to the collecting tool according to FIGS. 1 and 2.
Figures 4, 5:
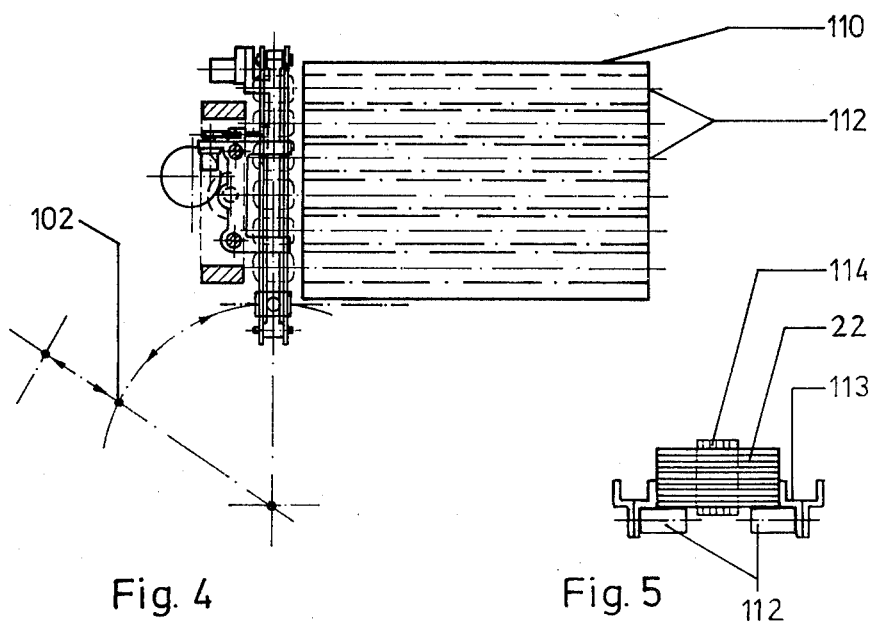
FIG. 4 is the delivery device of FIG. 3, in top view.
FIG. 5 is a cutout on a larger scale, showing a cross section through a stator sheet packet lying on a roller train of the delivery device according to FIGS. 3 and 4.

Guide 88 can be swung according to FIG. 4 into the extension that is directed toward the right with reference to FIG. 1, as indicated with dot-and-dash lines at 102. By swinging delivery device 26, this unit has a connection to a take-off and conveyor device 108 which can be moved vertically by a motor 104, via a threaded spindle 106. The said conveyor device 108 is disposed on the discharge side of a receptacle 110 which has a plurality of adjacent and superposed roller trains 112 on which stator sheet packets 22 with groove insulation 114 are stored. FIG. 5 shows a cross section through one of the roller trains 112, where it is to be observed that the groove insulation 114 finds space between the laterally staggered rollers that support the stator sheet packet 22. A great number of prepared stator sheet packets can be stored therefore in a receptacle 110 with roller trains 112, and they can be brought to the collecting station in the said receptacle 110. For automatic discharge of the stator sheet packets, it suffices if according to FIG. 3, receptacle 110 is set in a slanted position so that the stator sheet packets in the receptacle will tend to roll on roller trains 112 to conveyor device 108. Advantageously, receptacles 110 are made with the standard dimensions of box pallets and are stackable. The stator sheet packets are guided at the sides by shaped piece 113 of the frame that supports the rollers. Since there are many possibilities for the design of conveyor device 108, only the way it functions will be described here. Conveyor device 108 can comprise, for example, roller trains that can be moved vertically by means of a threaded spindle 106, which can be brought to a series of roller trains 112 of receptacle 110 and thereby release a lock so that the respective stator sheet packets 22 will roll out from the adjacent roller train 112 that is on the same level, onto the roller train of conveyor 108 which is oriented crosswise to roller train 112. Conveyor device 108 is then brought to the level of delivery and retaining device 26, where this device successively takes off the stator sheet packets that were released all at once from a roller train 112 of receptacle 110. Thereafter, conveyor 108 travels on to the outlet thereof or to another series of roller trains 112 and after release of a lock (not shown) on receptacle 110 again takes the stator sheet packets from the next lower roller train 112. This process is repeated until receptacle 110 is empty, and is then replaced in the shortest possible time by the next receptacle.

Instead of a roller train, conveyor device 108 can also be provided with a motor-driven mover. Suitable control and lock members ensure that the stator sheet packets 22 that are taken all at once from receptacle 110 will be given over individually to the delivery and retaining device 26.

What is claimed is:

1. Apparatus for the collecting of windings in a stator comprising a collecting tool comprising lamellae disposed in a ring, an aligning star piece, means for moving a stator sheet packet having an aperture therethrough in position adjacent the free ends of said lamellae, means for moving said aligning star piece from a retracted position through said aperture and into an alignment position between said lamellae to align said stator sheet packet and said ring of lamellae and means for automatically delivering stator sheet packts for movement into adjacency with the free ends of said lamellae comprising a magazine for storing stator sheet packets and a conveyor for moving stator sheet packets from said magazine to said stator sheet packet moving means, said magazine comprising a set of spaced roller trains on which the stored stator sheet packets are movable to said conveyor means, the spacing between said roller trains being wider than the aperture in said stator sheet packet to accommodate groove insulation located in said aperture and extending therebeyond.

2. Apparatus according to claim 1 further comprisng means for extending said lamellae, during a collecting operation, from a retracted position in which the free ends of said lamellae extend only a short distance into said aperture, to an extended position in which the free ends of said lamellae extend all the way through said aperture.

3. Apparatus according to claim 2 further comprising means for retracting said lamellae from said extended position to said retracted position.

4. Apparatus according to claim 3 further comprising a collecting star piece positioned within said ring of lamellae and movable axially thereof, a ring supporting said lamellae, a push rod for moving said ring to effect movement of said lamellae, and a further push rod to effect movement of said collecting star piece.

5. Apparatus according to claim 3 further comprising a collecting star piece positioned within said ring of lamellae and movable axially thereof and means for moving said collecting star piece simultaneously with movement of said lamellae.

6. Apparatus according to claim 5 wherein said collecting star piece moving means comprises a threaded ring supporting said lamellae, said threaded ring being fixed in rotation and movable axially of said ring of lamellae, a rotatable push rod movable axially of said ring of lamellae for moving said collecting star piece, said threaded ring being movable axially in response to rotation of said rotatable push rod.

7. Apparatus according to claim 1 wherein said aligning star piece moving means comprises means for retracting said aligning star piece from said alignment position to said retracted position.

8. Apparatus according to claim 1 further comprising means for holding a stator sheet packet in said position on the free ends of said lamellae during a collecting process.

9. Apparatus according to claim 8 wherein said aligning star piece is mounted coaxially in said stator holding means for independent coaxial movement during a collecting process.

10. Apparatus according to claim 1 wherein said collecting ring comprises an inner ring of collecting lamellae, an outer concentric ring of cover strip lamellae, and a collecting star piece positioned within said ring of collecting lamellae and movable axially thereof, and means for inserting the cover strips individually and directly into the collecting tool for storage prior to a collection process.

11. Apparatus according to claim 1 wherein said magazine comprises a plurality of sets of said spaced roller trains.

12. Apparatus according to claim 1 wherein said set of spaced roller trains is slanted to permit motion of stored stator sheet packets toward said conveyor means.

* * * * *